United States Patent [19]
Asskildt et al.

[11] Patent Number: 5,992,819
[45] Date of Patent: Nov. 30, 1999

[54] ARRANGEMENT IN A VALVE ACTUATOR

[75] Inventors: Knut Asskildt, Vollen, Norway; Göran Engdahl, Täby, Sweden

[73] Assignee: ABB Research Ltd., Zurich, Switzerland

[21] Appl. No.: 08/687,366

[22] PCT Filed: Feb. 6, 1995

[86] PCT No.: PCT/NO95/00026

§ 371 Date: Oct. 4, 1996

§ 102(e) Date: Oct. 4, 1996

[87] PCT Pub. No.: WO95/22026

PCT Pub. Date: Aug. 17, 1995

[30] Foreign Application Priority Data

Feb. 10, 1994 [NO] Norway ................................. 940447

[51] Int. Cl.⁶ ........................................... F16K 31/122
[52] U.S. Cl. ........................... 251/63.6; 137/565.33; 251/282
[58] Field of Search .................... 251/63.6, 282; 137/565.33

[56] References Cited

U.S. PATENT DOCUMENTS

| 3,656,708 | 4/1972 | Hobbs ................................. 251/63.6 |
| 4,145,025 | 3/1979 | Bergeron ............................ 251/63.6 |
| 4,795,131 | 1/1989 | Scarano et al. .................... 251/63 |
| 4,934,652 | 6/1990 | Golden .............................. 251/63.6 |

FOREIGN PATENT DOCUMENTS

| 0275227 | 7/1988 | European Pat. Off. . |
| WO8202423 | 7/1982 | WIPO . |
| WO8707352 | 12/1987 | WIPO . |

*Primary Examiner*—A. Michael Chambers
*Attorney, Agent, or Firm*—Volpe and Koenig, P.C.

[57] ABSTRACT

The present invention relates to an arrangement in a valve actuator (101) operating on a valve stem (113) provided with a piston (114) so as to close or open the valve (111), and in order to arrive at a variable area type hydraulic piston/cylinder, it is according to the present invention suggested that in addition to the valve stem piston (114) there could be provided one or more supplemental pistons (124).

18 Claims, 4 Drawing Sheets

ARRANGEMENT IN A VALVE ACTUATOR

FIELD OF THE INVENTION

The present invention relates to an arrangement in a valve actuator operating on a valve stem provided with a piston so as to close or open the valve.

PRIOR ART

From NO 141.024 (Exxon) there is known a balanced, fail-safe, hydraulically operated valve system for regulating the fluidum flow in a subsea pipe. The valve comprises a valve housing in which a valve body can be displaced by means of a valve stem carrying a piston at the one end thereof. The piston can by supply of fluid displace the valve body to open position and at the same time compress a spring, the energy of the compressed spring being used when the valve body is returned to its close position.

In order to assist the spring power in displacing the valve body to closed position, it is according to NO 141.024 suggested to use a further cylinder communicating with a further valve stem which is not permanently connected with but can be brought to abutment with the valve body, said further cylinder and the main cylinder of the valve stem piston being connected to a pipe arrangement bringing surrounding fluid pressure in connection with said main and further cylinders in order to secure closing of the valve body when the surrounding pressure is larger than the internal pressure in the valve.

However, this publication NO 141.024 does not give any instructions for how such an arrangement can be used to minimize power consumption during normal operations of a valve.

Further, from CH 627.247 there is known a remotely controlled valve communicating with a command unit through a hydraulic channel, which is connected with a hydropneumatic accumulator which through a hydraulic relay communicates with the actuator of the valve. The valve arrangement also comprises a commutator which senses the pressure in the hydraulic channel for appropriate charging of the accumulator for thereby being able to affect a rapid closing of the valve in case of emergency.

OBJECTS OF THE INVENTION

An object of the present invention is to provide a valve actuator by which the associated valve can be opened and/or closed with an optimum power consumption.

Another object of the present invention is to provide a valve actuator which with its energy economy can preform a controlled and uniform displacement of the valve and the valve stem in question.

Still another object of the present invention is to provide a valve actuator having a fail-safe performance not only during normal operation but also in an emergency situation.

Yet another-object of the invention is to provide a valve actuator bringing forth the necessary optimum power required in the so-called crack region, i.e. in the stem range near a closed position.

An object of the present invention is also to provide a valve actuator which can be regarded and operated as a variable piston area actuator.

A further object of the inventor is to provide a valve actuator in which the pistons reflect control valves implementation.

Another object of the invention is to provide a valve actuator operating in a closed hydraulic system offering electric interface only, and offering also the possibility of topping up the hydraulic fluidum reservoir by ROV or other means in case of leakage.

SUMMARY OF THE INVENTION

The above objects are achieved in an arrangement as stated in the preamble, which according to the present invention is characterized in that in addition to the valve stem piston there is provided one or more supplemental pistons or pistons means.

In a specific embodiment said valve stem piston and said one or more supplemental pistons can be connected to individually controlled hydraulic supplies, so as to be controlled as a variable area type of hydraulic piston/cylinder.

The individually controlled stem piston and the supplemental piston or pistons can be controlled to be activated individually depending on the stroke position of the stem between and including open and closed position of the valve.

A preferred embodiment reflecting control valves implementation could involve that the valve stem piston or pistons are provided with a first larger diameter, larger than a first portion of the stem, and that said supplemental piston or pistons are provided by a first stepdown diameter of said first portion stem diameter.

Appropriately, such stem piston and auxiliary pistons can be arranged to operate on a balanced valve stem.

The fail-safe operation of the valve actuator may appropriately be assisted by providing at least one energy storing unit with an energy storage having a capacity of more than what is needed for one (worst case) opening or closing stroke of the valve.

Such energy storing unit may appropriately be charged by a relatively small power consuming electric motor driving a hydraulic pump.

It should also be understood that the arrangement in a valve actuator according to the present invention can be installed in a closed hydraulic system, operating only through an electric supply.

It is to be understood that the actuator according to the present invention may comprise means for communicating with gate cavity pressure or well pressure for assisting opening and closing operations of said valve, especially at large differential pressures.

Still appropriately, the valve stem piston and possibly one or more supplemental pistons can be incorporated in an actuator comprising a hydraulic power unit including at least one gas supply unit. Such a hydraulic power unit may comprise a high pressure hydraulic chamber including a first gas supply unit, and a low pressure hydraulic chamber including a second gas supply unit.

The actuator may then comprise a demand valve communicating with a piston/stem displacement sensor to regulate the gas flow according to the piston and/or movement of the piston/stem, so as to provide an adaptive opening and closing of the valve in question, so that the energy released from energy storage adapts to the actual energy needed for closing or opening of the valve within a specified time span, for the actual pressure difference over the valve.

In order to assist the opening and closing operation of the valve, in case of significant static friction forces, it is according to the invention appropriate that the valve actuator comprises a force generator, e.g. at least one mass element initially held at rest by a locking unit and upon release of said locking unit being accelerated to hammer against any piston or appropriate stem section, or possibly a Terfenol means with appropriate control means.

BRIEF DISCLOSURE OF THE DRAWINGS

Further objects and advantages in the arrangement according to the present invention will now appear from the following description taken in conjunction with the enclosed drawings, and from the appended claims.

Figure 3:
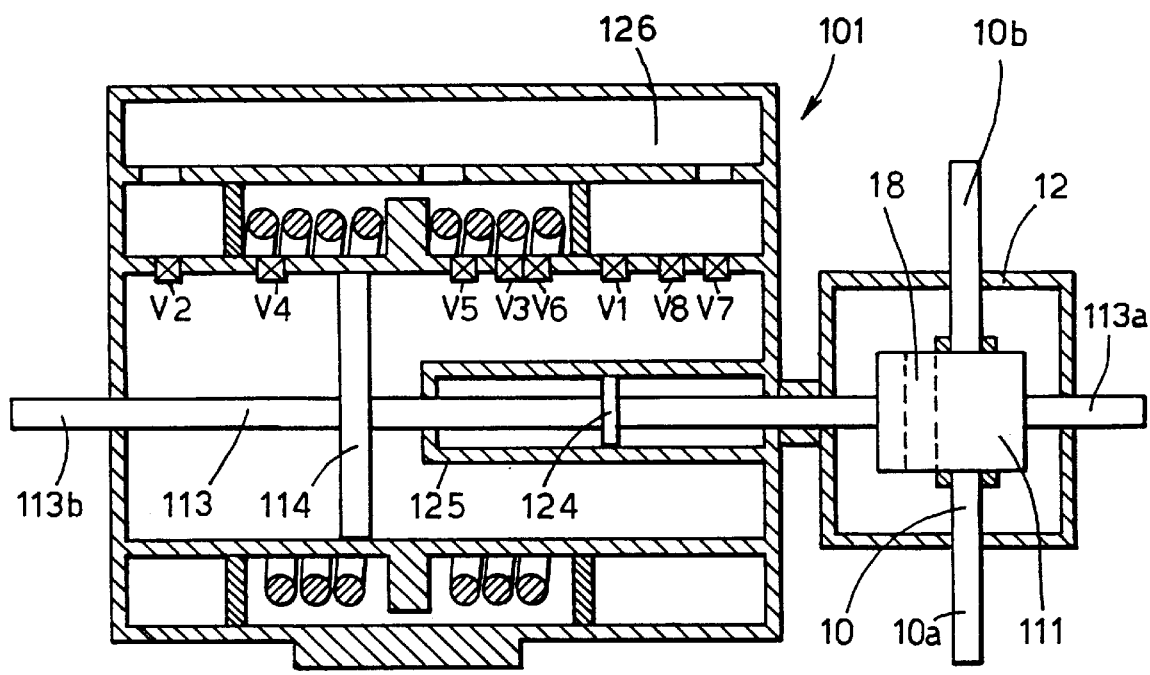

FIG. 3 is a sketch illustrating an embodiment of a valve actuator according to the present invention, in which a small cylinder/piston takes care of the friction forces acting along the whole stroke, whereas a bigger cylinder/piston is acting mainly in the crack region and if the differential pressure is sufficiently high, said structure also including an energy storage and a recharging device so as to achieve a closed hydraulic system controlled and powered electrically only.

Figure 4:
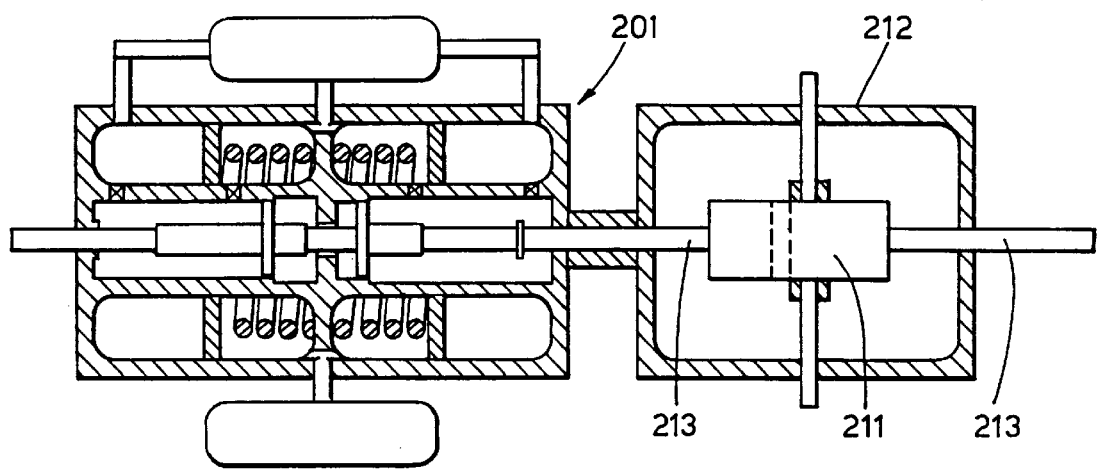

FIG. 4 is a sketch illustrating another embodiment of an arrangement in a valve actuator according to the present invention, involving a simplification of the structure in FIG. 3, the number of control valves being reduced essentially to one standard hydraulic control valve, the others being integrated into the piston arrangement.

Figure 5:
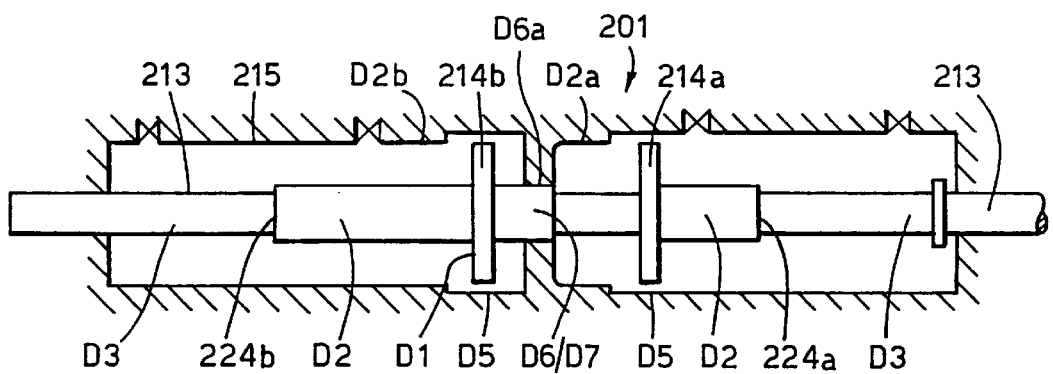

FIG. 5 is a simplified sketch on a larger scale illustrating the piston stem position outside the crack area.

Figure 6:
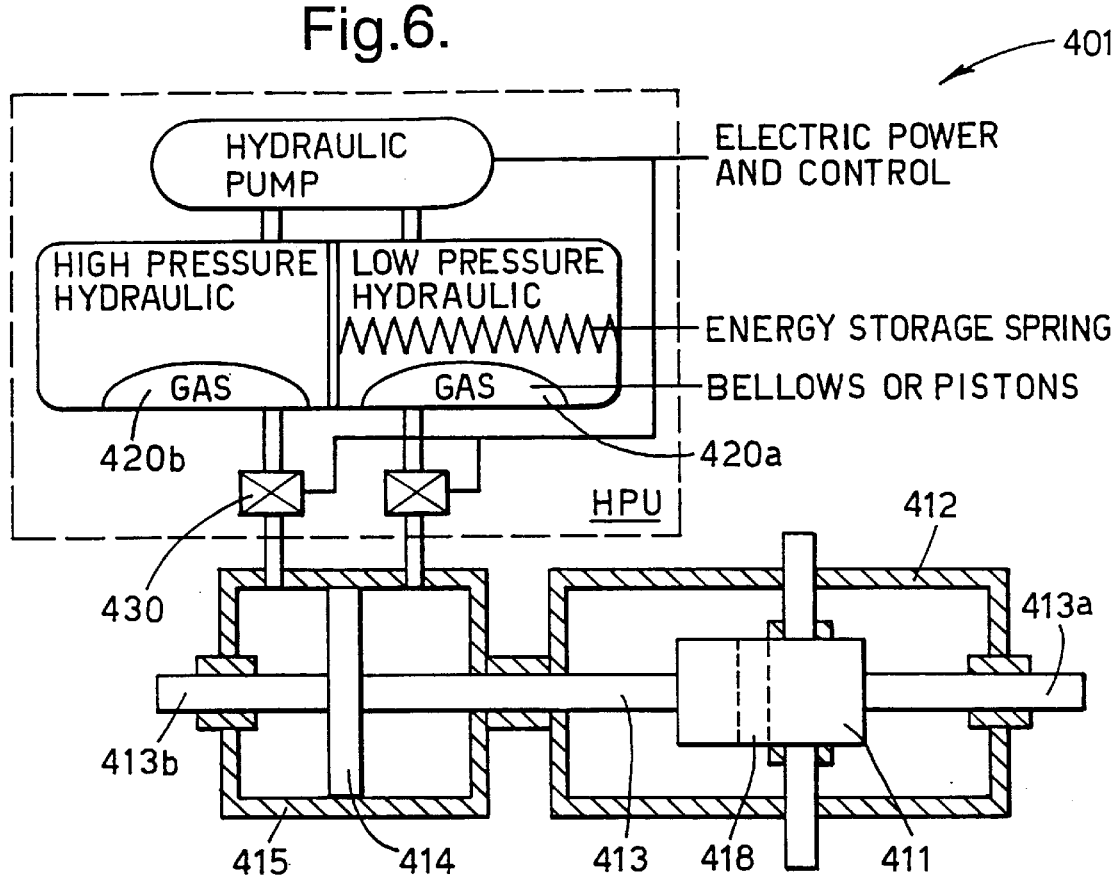

FIG. 6 is a sketch illustrating still another embodiment of the present invention, in which embodiment gas is used for energy transfer between the storage and the stem/gas unit, the gas volume being separated from the hydraulic fluid by bellows, the high pressure control valve here being a demand valve, only releasing as much gas and thereby as much energy as needed for the actual opening of the main valve (additional valves being needed for taking care of the closing process).

Figure 7:
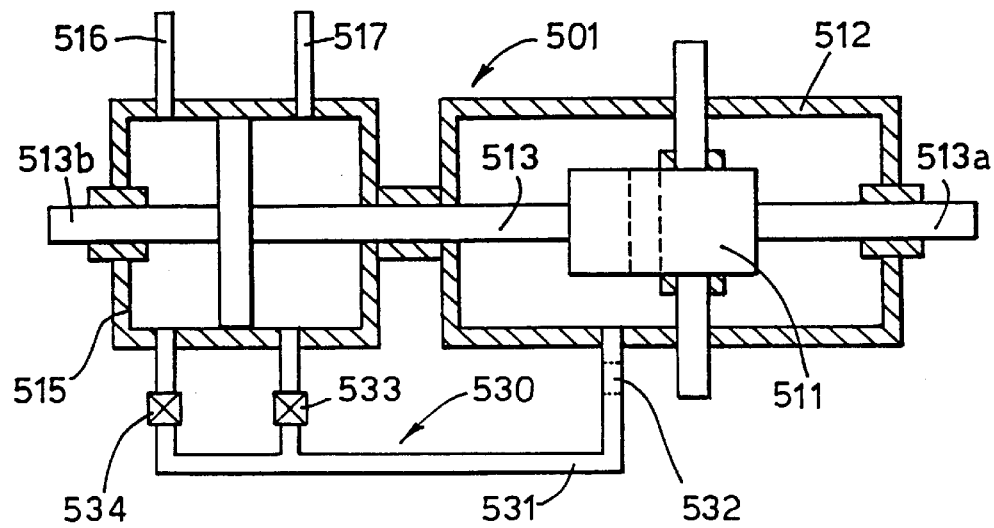

FIG. 7 is a sketch illustrating still another embodiment according to the present invention, in which said actuator comprises means communicating with gate cavity pressure or well pressure for assisting in opening and closing operations of said valve, especially at large crack forces.

DETAILED DESCRIPTION OF EMBODIMENTS

The present invention has been developed specifically in connection-with an all-electric subsea control system, but it-is to be understood that the outcome of this development can be utilised not only for subsea control systems but also in other or related fields of application.

Figure 1:
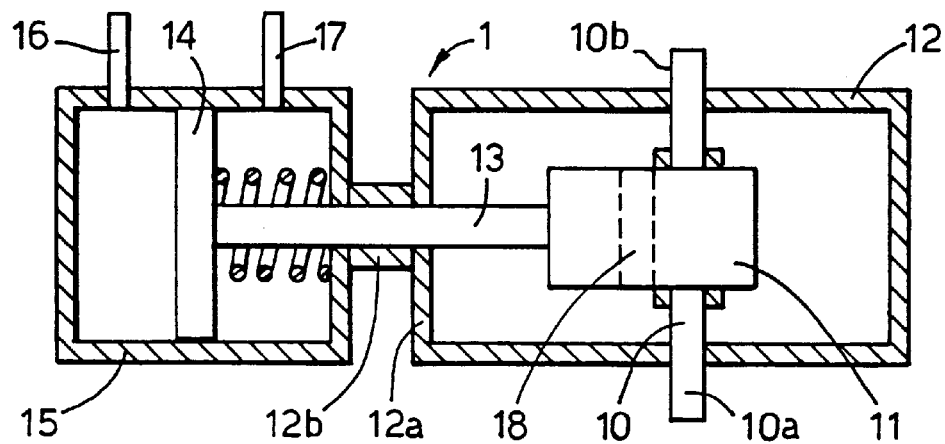
FIG. 1 is a sketch of a conventional electro-hydraulic valve and actuator structure.

In connection with FIG. 1 which is a sketch of a conventional electro-hydraulic valve and actuator structure 1, there is illustrated a subsea or land-based production pipe 10 having a downstream side 10b and an upstream side 10a, separated by a valve gate or valve body 11. The latter is housed in a valve housing 12 and is connected to a valve stem 13 which through a stem packing 12b in one of the end walls 12a of the valve housing 12 is connected to a valve stem piston 14, operating in a cylinder 15 through hydraulic pipes 16 and 17, respectively, in order to close or open the valve gate 11. The valve gate 11 in FIG. 1 is illustrated in its closed position, whereas a displacement of the valve stem piston 14 to the right of the drawing will displace the valve gate 11 to bring the through-going gate opening 18 in register with the position of the production pipe 10.

Figure 2:
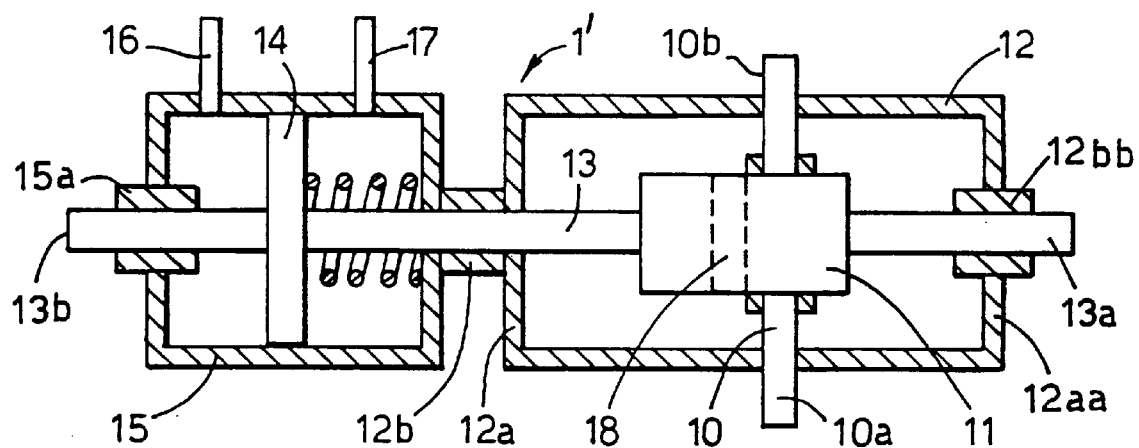
FIG. 2 is a sketch of a symmetric valve/actuator in which the stem forces due to gate cavity pressure acting on the stem cross section, vanish.

In FIG. 2 there is illustrated an embodiment of a valve arrangement 1' including a symmetric or balanced valve stem 13, wherein the valve stem 13 is taken out through another end wall 12aa of the actuator/gate housing 12 at its one end 13a through a packing 12bb in said housing, and is also taken out through the actuator/gate cylinder housing 15 at its opposite end 13b through a packing 15a in the cylinder 15.

The structure illustrated in FIG. 2 is symmetric and no volume displacement inside the valve/actuator housing 12, 15 takes place when the gate 11 and the associated stem 13 is moved. Since the stem 13 is taken out of the actuator/gate housing at both ends through appropriate packings, no net force due to gate cavity pressure, $P_{gate}$ will contribute to the energy, i.e. will be zero. For practical reasons the stem ends 13a and 13b may have to be terminated outside the housing in not illustrated pressure compensated chambers. The additional packing friction forces contributing to the energy will be small.

One of the major objects of the present invention is to arrive at a variable area type hydraulic piston/cylinder, and in FIG. 3 there is illustrated a first embodiment of such a structure, i.e. a valve actuator arrangement 101 operating on a valve stem 113 provided with a piston 114 so as to close or open the valve 111, which in addition to the valve stem piston 114 is also provided with one or more supplemental pistons.

As appearing from FIG. 3, the stem 113 is in this non-limiting embodiment provided with a first valve stem piston 114, and in addition thereto there is provided at least one smaller supplemental piston 124. The supplemental piston 124 is arranged in its own supplemental cylinder 125, and the small cylinder/piston is designed to take care of the, possible worst case, friction forces that may be acting along the whole stroke, the bigger cylinder/piston 114 acting if the full differential gate friction force (crack force) must be defeated. In the embodiment illustrated in FIG. 3 all pistons are fixed to the gate stem 113, but it is to be understood that many other configurations can be contemplated. The hydraulic pump 126 will have its low pressure side compensated towards the sea-water pressure.

It should be noted that there are suggested 8 valves V1–V8, which will control the movement of the valve gate 111, and most appropriately the individually controlled stem piston 114 and supplemental piston 125 are controlled to be activated individually, depending on the stroke position of the stem 113 between and including open and closed position of the valve gate 11, as well as depending on the actual differential pressure.

In the following table the operation of valves V1–V8 is shown.

| V1 | V2 | V3 | V4 | V5 | V6 | V7 | V8 | Gate valve mode | Gate region |
|----|----|----|----|----|----|----|----|-----------------|-------------|
| 0  | 0  | 1  | 1  | 1  | 0  | 0  | 1  | closing, no crack force | whole |
| 0  | 0  | 1  | 1  | 1  | 0  | 0  | 1  | closing, full crack force | outside crack region |
| 0  | 0  | 1  | 1  | 0  | 0  | 1  | 1  | closing, full crack force | crack region |
| 1  | 0  | 0  | 1  | 1  | 1  | 0  | 0  | opening, no crack force | whole |

-continued

| V1 | V2 | V3 | V4 | V5 | V6 | V7 | V8 | Gate valve mode | Gate region |
|---|---|---|---|---|---|---|---|---|---|
| 1 | 0 | 0 | 1 | 1 | 1 | 0 | 0 | opening, full crack force | outside crack region |
| 1 | 1 | 0 | 0 | 1 | 1 | 0 | 0 | opening, full crack force | crack region |

In the above table the value 0 means that the control valve is closed, whereas 1 means open. The term "no crack force" may actually refer to crack forces corresponding to low differential pressures, say 50 bar.

Note that the stem/gate unit is in balance as long as no hydraulic forces are applied and irrespective of the pressure conditions in the gate cavity. This means that in principle it is not necessary to apply any hydraulic forces to keep the valve in open or closed position. That is, one can leave all the valves V1 to V8 closed when the gate valve is open or closed, and the hydraulic packings in the cylinders need only be dynamically tight.

The operation of the actuator in FIG. 3 needs information about when to put the big piston/cylinder to action, and this could be obtained by for example a proximity sensor which indicates whether the gate valve is open or closed and/or the position of the stem/gate unit.

The embodiment of an actuator arrangement 201 illustrated in FIGS. 4 and 5 differs from the embodiment of FIG. 3, in that two small supplemental pistons 224a and 224b are made integral with the stem 213, and are designed to operate together with two crack pistons 214a and 214b, all of which are arranged in the same housing 215. Generally, in this case both a small and a big piston will only act in the crack area, i.e. a crack piston (214) will not act outside the crack region. The actuator will then need a certain amount of energy for any operation irrespective of the differential pressure, whereas the actuator in FIG. 3 has the potential of reducing the energy according to the actual forces.

To further illustrate the operation of the embodiment according to FIGS. 4 and 5, it should be referred to FIG. 5, from where it appears that the valve stem piston 214a or pistons 214a, 214b are provided with a first larger diameter D1 larger than a first portion D2 of the stem 213, and that said supplemental piston 224a or pistons 224a, 224b are provided by a first step-down diameter D3 of said first portion stem diameter D2.

Further it is to be understood that said at least one valve stem piston 214a, 214b is arranged in a cylinder 215 and operates actively along a first cylinder portion D2a, D2b having the same inner diameter as said stem piston 214a, 214b and defining the crack region (FIG. 4, 5) thereof, and that said cylinder 215 has a second cylinder portion D5 with a larger diameter than said valve stem piston 214a, 214b outside said crack region where said stem piston 214a, 214b is non-active.

From FIG. 5 it also appears that said valve stem 213 is also provided with a second stem portion D6, D7 provided with a second step-down diameter section, the larger diameter D6 thereof communicating with a cylinder portion D6a of same inner diameter when said stem 213 is outside said crack region.

It is to be understood that the embodiments illustrated in FIG. 3 and FIG. 4 have been designed to operate on a balanced valve stem, 113 and 213, respectively, but it is also to be understood that such multiple-piston operation could also be performed on embodiments illustrated in FIG. 1.

Further, it should be understood that the valve stem piston and possibly also one or more supplemental pistons can be incorporated in an actuator comprising a hydraulic power unit including at least one gas supply unit.

In order arrive at an arrangement in a valve actuator that applies a force to the stem/gate unit which at all x-values is just big enough to actually move the stem/gate. in the wanted direction, there is according to the present invention suggested a so-called "demand valve" at the high pressure inlet. An embodiment of such a structure 401 is illustrated in FIG. 6, where gas is used for energy transfer between the storage HPU and the stem/gate unit. The gas volume is separated from the hydraulic fluid by bellows 420a, 420b, or possibly by not illustrated pistons. Only one demand valve 430 is here indicated, it being understood that FIG. 6 only illustrates the valves needed for opening the gate valve 411. Two additional valves or a multiplexer will be needed for closing operation.

In case it is wanted to open the gate valve 411 at full differential pressure, then the "demand valve" 430 will supply gas to the high pressure side of the piston 414 until the pressure is high enough to start moving the piston. The "demand valve" regulates the gas flow according to the movement of the piston, i.e. proportional to the friction forces acting on the stem/gate unit 413, 411. When the piston 414 reaches the crack position, the gate friction force drops to zero. The gas will now perform an expansion as the piston 414 continues towards open position, until the pressure is again balancing the friction forces and additional gas will be supplied if the final open position has not been reached.

The embodiments of a valve actuator disclosed so far may comprise means for communicating with gate cavity pressure or production pressure for assisting in opening and closing operations of said valve, especially at large gate differential pressures.

Consequently, the failsafe gate valve actuator can be assisted by the gate cavity pressure when closing or opening. As it is known, the worst case condition dimensioning of the failsafe spring is therefore actually when closing at very low gate cavity pressure, i.e. no-flow condition.

The two-piston or multi-piston actuators described above could possibly be "modified" so as to take advantage of the large gate cavity pressure when it exists, i.e. when large crack forces exist. That is, it is not necessary to extract energy from the energy storage for overcoming any crack forces, and the energy storage can be reduced significantly, or there can be used a direct actuator with low power levels.

An appropriate non-limiting embodiment is illustrated in FIG. 7, involving that the gate cavity pressure $P_{gate}$ is transferred to the actuator housing 515 through a suitable pipe or bore 531, provided in the walls of the structure or even provided as an internal bore in the valve stem 513. There must be an adequate interface between the clean hydraulic fluid acting in the actuator housing and the harmful production oil in the gate cavity. The interface must be absolutely tight and be able to take up the worst case fluid displacement while actuating the crack piston. The interface could possibly comprise bellows or pistons 532, for instance situated at the inlet of the bore in the gate cavity 512.

Generally, the embodiment according to FIG. 7 illustrates that said actuator 501 comprises means 530 communicating with gate cavity pressure $p_{gate}$ or well pressure for assisting in opening and closing operations of said valve 511, especially at large crack forces.

More specifically it appears from FIG. 7 that said means 530 communicating with cavity pressure 512, $P_{gate}$ comprises a conduit 531 arranged between an actuator/gate housing 512 and a valve/actuator housing 515, and including further means 532-534 for controlling fluidum pressure therebetween.

Said conduit 531 is preferably a hydraulic fluid conduit comprising an isolating means, for example a piston 532 or a bellows, as well as control valves 533, 534 for controlling auxiliary pressure from said actuator/gate housing 512 to said valve/actuator housing 515, possibly independent of or simultaneously with normal hydraulic pressure supplied through other hydraulic pipes 516, 517.

Finally, the embodiments disclosed herein could find their application especially in a closed hydraulic system, operated only through an electric supply.

A possible difficulty of any hydraulic actuator is that if considerable static friction exists, one needs to dimension the piston areas according to the maximum force, and the energy taken from the energy storage will be as if the static friction forces were acting all along the path, even if the energy associated with the static friction is negligible. Only a "sharp kick", with little energy but sufficiently high force, is necessary to overcome the static friction force. This may be achieved by a "Terfenol hammer" or by a mass that is accelerated by a (small) spring.

The magnetrostictive material Terfenol-D is an appropriate material for achieving a short energy pulse with very high force but with limited energy. It is probably very suited for overcoming static friction forces without needing to extract a lot of energy from the energy storage (or overload a direct actuator at start point).

We claim:

1. Arrangement in a valve actuator (101; 201) operating on a valve stem (113; 213) provided with a piston (114; 214) so as to close or open the valve (111; 211), which arrangement also comprises a piston means in addition to the valve stem piston (114; 214), characterized in that at least one supplemental piston (124; 224a, 224b) is provided in addition to the valve stem piston (114; 214) and is arranged so as to in relation to the valve stem piston provide an additional force on said valve stem (113; 213) for thereby in a controlled manner and with minimum energy displacing said valve stem through valve stem positions being subjected to largely varying friction forces; said valve stem piston (114) and said supplemental piston (124) connected to individually controlled hydraulic supplies (V1–V8), so as to be controlled as a variable area type of hydraulic piston/cylinder.

2. Arrangement as claimed in claim 1, characterized in that the stem piston (114; 214) and supplemental piston (124; 224a, 224b) are controlled to be activated individually depending on the stroke position of the stem (113; 213) between and including open and closed position of the valve (111, 211).

3. Arrangement as claimed in claim 1, characterized in that said valve stem piston (114; 214) and said supplemental piston (114; 224a, 224b) are fixed to the valve stem (113; 213).

4. Arrangement as claimed in claim 1, characterized in that the valve stem piston (214a) is provided with a first larger diameter (D1) larger than a first portion (D2) of the stem (213), and that said supplemental piston (224a) is provided by a first step-down diameter (D3) of said first portion stem diameter (D2).

5. Arrangement as claimed in claim 4, characterized in that said at least one valve stem piston (214a, 214b) is arranged in a cylinder (215) and operates actively along a first cylinder portion (D2a, D2b) having the same inner diameter as said stem piston (214a, 214b) and defining a crack region (FIGS. 4, 5) thereof, and that said cylinder (215) has a second cylinder portion (D5) with a larger diameter than said valve stem piston (214a, 214b) outside said crack region where said stem piston (214a, 214b) is non-active.

6. Arrangement as claimed in claim 4, characterized in that said valve stem (213) is also provided with a second stem portion (D6, D7) provided with a second step-down diameter section, the larger diameter (D6) thereof communicating with a cylinder portion (D6a) of same inner diameter when said stem (213) is outside said crack region.

7. Arrangement as claimed in claim 1, characterized in that the supplemental piston has a smaller diameter than the valve stem piston and both pistons are designed to be displaced independent of each other.

8. Arrangement as claimed in claim 1, characterized in that said piston or pistons are arranged to operate on a balanced valve stem (113; 213).

9. Arrangement as claimed in claim 1, characterized in that said valve actuator is installed in a closed hydraulic system, especially a subsea system, operating only through an electric supply.

10. Arrangement as claimed in claim 1, characterized in that said actuator comprises at least one energy storing unit, having an energy storage capacity corresponding to what is needed for one or more full strokes without supply of external energy.

11. Arrangement as claimed in claim 10, characterized in that said energy saving unit is charged by a relatively small power consuming electrically powered hydraulic pump.

12. Arrangement as claimed in any claim 1, characterized in that said actuator (501) comprises means (530) communicating with a gate cavity whereby pressure ($p_{gate}$) within said gate cavity assists in opening and closing operations of said valve (511), especially at large crack forces.

13. Arrangement as claimed in claim 12, characterized in that said means (530) communicating with said gate cavity comprises a conduit (531) arranged between an actuator/gate housing (512) and a valve/actuator housing (515), and including further means (532–534) for controlling fluidum pressure there between.

14. Arrangement as claimed in claim 13, characterized in that said conduit (531) is preferably a hydraulic fluid conduit comprising an isolating means as well as control valves (533, 534) for controlling auxiliary pressure from said actuator/gate housing (512) to said valve/actuator housing (515).

15. Arrangement as claimed in claim 1, characterized in that the valve stem piston and supplemental piston are incorporated in an actuator (401) comprising a hydraulic power unit (HPU) including at least one gas supply unit (420a, 420b).

16. Arrangement as claimed in claim 15, characterized in that said hydraulic power unit (HPU) comprises a high pressure hydraulic chamber including a first gas supply unit (420b), and a low pressure hydraulic chamber including a second gas supply unit (420a).

17. Arrangement as claimed in claim 15 or 16, characterized in that the actuator (410) comprises a demand valve (430) communicating with a piston/stem displacement sensor to regulate the gas flow according to the position of the piston and/or movement of the piston/stem (413, 414).

18. Arrangement as claimed in claim 1 further comprising a force generator for assisting in displacement of said value stem against possible static friction positions.

* * * * *